US012528071B2

(12) United States Patent
Herfert et al.

(10) Patent No.: US 12,528,071 B2
(45) Date of Patent: Jan. 20, 2026

(54) PROCESS FOR PRODUCING SUPERABSORBENT POLYMER PARTICLES

(71) Applicant: BASF SE, Ludwigshafen (DE)

(72) Inventors: Norbert Herfert, Ludwigshafen (DE); Sukanya Nuasaen, Rayong (TH); Peannapa Arsoon, Rayong (TH)

(73) Assignee: BASF SE, Ludwigshafen (DE)

( * ) Notice: Subject to any disclaimer, the term of this patent is extended or adjusted under 35 U.S.C. 154(b) by 498 days.

(21) Appl. No.: 18/025,945

(22) PCT Filed: Sep. 6, 2021

(86) PCT No.: PCT/EP2021/074463
§ 371 (c)(1),
(2) Date: Mar. 13, 2023

(87) PCT Pub. No.: WO2022/058190
PCT Pub. Date: Mar. 24, 2022

(65) Prior Publication Data
US 2023/0364584 A1 Nov. 16, 2023

(30) Foreign Application Priority Data
Sep. 17, 2020 (WO) ............... PCT/CN2020/115943

(51) Int. Cl.
B01J 20/00 (2006.01)
B01J 20/26 (2006.01)
B01J 20/28 (2006.01)
C08F 220/06 (2006.01)
C08F 222/10 (2006.01)
C08J 3/075 (2006.01)
C08J 3/24 (2006.01)
C08K 3/22 (2006.01)
C08K 5/17 (2006.01)

(52) U.S. Cl.
CPC ........ *B01J 20/261* (2013.01); *B01J 20/28004* (2013.01); *B01J 20/28047* (2013.01); *C08F 220/06* (2013.01); *C08F 222/103* (2020.02); *C08J 3/075* (2013.01); *C08J 3/245* (2013.01); *C08K 3/22* (2013.01); *C08K 5/175* (2013.01); *B01J 2220/68* (2013.01); *C08K 2003/2227* (2013.01)

(58) Field of Classification Search
CPC ............... B01J 20/261; B01J 20/28004; B01J 20/28047; B01J 2220/68; C08F 222/103; C08F 220/06; C08J 3/075; C08J 3/245; C08K 3/22; C08K 5/175; C08K 2003/2227
USPC ........................................ 502/402
See application file for complete search history.

(56) References Cited

U.S. PATENT DOCUMENTS

2017/0037172 A1* 2/2017 Stueven .................. C08F 2/34

FOREIGN PATENT DOCUMENTS

CN 101851340 A * 10/2010
EP 1512712 A1 * 3/2005 ............ A61L 15/60

OTHER PUBLICATIONS

International Application No. PCT/EP2021/074463, International Search Report and Written Opinion, mailed Jan. 31, 2022.

* cited by examiner

*Primary Examiner* — James E Mcdonough
(74) *Attorney, Agent, or Firm* — Element IP, PLC

(57) ABSTRACT

The invention relates to a process for producing superabsorbent polymer particles, comprising polymerization of a monomer solution, drying the formed polymer gel, grinding the dried polymer gel, classifying and thermally surface post-crosslinking the polymer particles, wherein the monomer solution comprises a chelating agent and an aluminum salt.

12 Claims, No Drawings

PROCESS FOR PRODUCING SUPERABSORBENT POLYMER PARTICLES

The invention relates to a process for producing superabsorbent polymer particles, comprising polymerization of a monomer solution, drying the formed polymer gel, grinding the dried polymer gel, classifying and thermally surface post-crosslinking the polymer particles, wherein the monomer solution comprises a chelating agent and aluminum cations.

Superabsorbent polymer particles are used to produce diapers, tampons, sanitary napkins and other hygiene articles, but also as water-retaining agents in market gardening. The superabsorbent polymer particles are often also referred to as "absorbent resins", "superabsorbents", "superabsorbent polymers", "absorbent polymers", "absorbent gelling materials", "hydrophilic polymers" or "hydrogels".

The production of superabsorbent polymer particles is described in the monograph "Modern Superabsorbent Polymer Technology", F. L. Buchholz and A. T. Graham, Wiley-VCH, 1998, pages 71 to 103.

WO 2008/009599 A1 discloses the use of aluminum salts as permeability enhancer and EP 264 485 A1 discloses the use of aluminum salts as foam-promoting agents.

It was an object of the present invention to provide a process for producing superabsorbent polymer particles having improved properties, especially high absorption speed.

The object was achieved by a process for producing superabsorbent polymer particles, comprising polymerization of a monomer solution, comprising
a) at least one ethylenically unsaturated monomer which bears acid groups an may be at least partly neutralized,
b) at least one crosslinker,
c) at least one initiator,
d) optionally one or more ethylenically unsaturated monomers copolymerizable with the monomer mentioned under a) and
e) optionally one or more water-soluble polymers, drying the formed polymer gel, grinding the dried polymer gel, classifying and thermally surface post-crosslinking of the polymer particles, wherein the monomer solution further comprises from 0.001 to 1.00 mol-%, preferably from 0.005 to 0.75 mol-%, more preferably from 0.010 to 0.50 mol-%, most preferably from 0.050 to 0.25 mol-%, of a chelating agent and from 0.0001 to 0.100 mol-%, preferably from 0.0005 to 0.075 mol-%, more preferably from 0.001 to 0.050 mol-%, most preferably from 0.005 to 0.025 mol-% of an aluminum cation, each based on monomer a).

Suitable chelating agents are amino carboxylic acids, for example methyliminodiacetic acid, methylglycinediacetic acid, nitrilotriacetic acid, diethylentriaminepentaacetic acid, (hydroxyethyl)-ethylendiaminetriacetic acid, and ethylenediaminetetraacetic acid, or salts thereof.

All water-soluble aluminum salts, for example aluminum sulfate, aluminum chloride, aluminum monoacetate, and aluminum trilactate, can be used as source for the aluminum cation in the monomer solution. Aluminum trilactate is preferred.

The invention is based on the finding that the absorption speed can be improved by addition of chelating agents and aluminum cations to the monomer solution. Addition of chelating agents alone or addition of aluminum cations alone has no effect or a contrary effect on the absorption speed.

Preferably from 0.01 to 2.0% by weight, more preferably from 0.05 to 1.2% by weight, most preferably from 0.15 to 0.6% by weight, of aluminum hydroxide, based on the polymer particles, is added to the polymer particles prior, during or after thermal surface post-crosslinking. X-ray amorphous aluminum hydroxide, as described in WO 2019/197194 A1, is preferred.

Aluminum hydroxide on the surface of the superabsorbent polymer particles improves the permeability.

Preferably from 0.001 to 0.15 mol/kg, more preferably from 0.003 to 0,10 mol/kg, most preferably from 0.005 to 0.05 mol/kg, of an aluminum cation, based on the polymer particles, is added as aqueous solution to the polymer particles prior, during or after thermal surface post-crosslinking.

All water-soluble aluminum salts, for example aluminum sulfate, aluminum chloride, aluminum monoacetate, and aluminum trilactate, can be used as source for the aluminum cation to be added to the polymer particles. Aluminum trilactate is preferred.

The present invention further provides superabsorbent polymer particles obtainable by the inventive process.

The production of the superabsorbent polymer particles is described in detail hereinafter:

The superabsorbent polymer particles are typically insoluble but swellable in water.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids such as acrylic acid, methacrylic acid, maleic acid, and itaconic acid. Particularly preferred monomers are acrylic acid and methacrylic acid. Very particular preference is given to acrylic acid.

Further suitable monomers a) are, for example, ethylenically unsaturated sulfonic acids such as vinyl sulfonic acid, styrene sulfonic acid and 2-acrylamido-2-methylpropane-sulfonic acid (AMPS).

Impurities may have a strong impact on the polymerization. Preference is given to especially purified monomers a). Useful purification methods are disclosed in WO 2002/055469 A1, WO 2003/078378 A1 and WO 2004/035514 A1. A suitable monomer a) is according to WO 2004/035514 A1 purified acrylic acid having 99.8460% by weight of acrylic acid, 0.0950% by weight of acetic acid, 0.0332% by weight of water, 0.0203 by weight of propionic acid, 0.0001% by weight of furfurals, 0.0001% by weight of maleic anhydride, 0.0003% by weight of diacrylic acid and 0.0050% by weight of hydroquinone monomethyl ether.

The content of acrylic acid and/or salts thereof in the total amount of monomers a) is preferably at least 50 mol %, more preferably at least 90 mol %, most preferably at least 95 mol %.

The monomers a) comprise typically polymerization inhibitors, preferably hydroquinone mono ethers, as inhibitor for storage.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone mono ether, based in each case on unneutralized acrylic acid. For example, the monomer solution can be prepared by using acrylic acid with an appropriate content of hydroquinone mono ether.

Preferred hydroquinone mono ethers are hydroquinone monomethyl ether (MEHQ) and/or alpha tocopherol (vitamin E).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or polypropoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on unneutralized acrylic acid. With rising crosslinker content, the centrifuge retention capacity (CRC) falls and the absorption under a pressure of 21.0 $g/cm^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with acrylic acid are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

The monomer solution is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 50 to 85 mol %, more preferably from 60 to 80 mol % and most preferably from 65 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, potassium hydroxide and also mixtures thereof.

The resulting polymer gel is dried. The driers are not subject to any restriction. However, the drying of the polymer gel is preferably performed with a belt drier until the residual moisture content is preferably 0.5 to 10% by weight, more preferably 1 to 7% by weight and most preferably 2 to 5% by weight, the residual moisture content being determined by EDANA recommended test method No. WSP 230.2(05) "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent grinding steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Subsequently, the dried polymer gel is ground and classified. The apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 pm. The mean particle size of the product fraction may be determined by means of EDANA recommended test method No. WSP 220.2(05) "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the saline flow conductivity (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface post-crosslinking or another coating step. In this case, the excessively small polymer particles recycled are surface post-crosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting superabsorbent polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles of excessively large particle size lower the free swell rate (FSR). The proportion of excessively large polymer particles should therefore likewise be small.

Excessively large polymer particles are therefore typically removed and recycled into the grinding of the dried polymer gel.

To improve the properties, the polymer particles are subsequently be thermally surface post-crosslinked. Suitable surface post-crosslinkers are compounds which comprise groups which can form covalent bonds with at least two acid groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface post-crosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface post-crosslinkers are ethylene carbonate, ethylene glycol diglycidyl ether, reaction products of polyamides with epichlorohydrin and mixtures of propylene glycol and 1,4-butanediol.

Very particularly preferred surface post-crosslinkers are 2-hydroxyethyloxazolidin-2-one, oxazolidin-2-one and 1,3-propanediol.

In addition, it is also possible to use surface post-crosslinkers which comprise additional polymerizable ethylenically unsaturated groups, as described in DE 37 13 601 A1.

The amount of surface post-crosslinker is preferably 0.001 to 2% by weight, more preferably 0.02 to 1% by weight and most preferably 0.05 to 0.2% by weight, based in each case on the polymer particles.

In a preferred embodiment of the present invention, aluminum cations are applied to the particle surface in addition to the surface post-crosslinkers before, during or after the surface post-crosslinking.

The surface post-crosslinking is typically performed in such a way that a solution of the surface post-crosslinker is sprayed onto the dried polymer particles. After the spray application, the polymer particles coated with surface post-crosslinker are dried thermally, and the surface post-crosslinking reaction can take place either before or during the drying.

The spray application of a solution of the surface post-crosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface post-crosslinker solution in a fluidized bed.

The surface post-crosslinkers are typically used in the form of an aqueous solution. The penetration depth of the surface post-crosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal surface post-crosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The thermal surface post-crosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface post-crosslinking temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface post-crosslinked polymer particles can be classified again, excessively small and/or excessively large polymer particles being removed and recycled into the process.

To further improve the properties, the surface post-crosslinked polymer particles can be coated or remoisturized.

The remoisturizing is preferably performed at 30 to 80° C., more preferably at 35 to 70° C., most preferably at 40 to 60° C. At excessively low temperatures, the superabsorbent polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

Methods:

The measurements should, unless stated otherwise, be carried out at an ambient temperature of 23±2° C. and a relative atmospheric humidity of 50±10%. The superabsorbent polymer particles are mixed thoroughly before the measurement.

Centrifuge Retention Capacity (CRC)

The centrifuge retention capacity of superabsorbent polymer particles is determined by the EDANA recommended test method No. WSP 241.2(05) "Gravimetric Determination of Fluid Retention Capacity in Saline Solution After Centrifugation", wherein for higher values of the centrifuge retention capacity lager tea bags must be used.

Vortex 1.00 g of the dry superabsorbent polymer particles is weighed into a 25 ml glass beaker and is uniformly distributed on the base of the glass beaker. 20 ml of a 0.9% by weight sodium chloride solution are then dispensed into a second glass beaker, the content of this beaker is rapidly added to the first beaker and a stopwatch is started. As soon as the last drop of salt solution is absorbed, confirmed by the disappearance of the reflection on the liquid surface, the stopwatch is stopped.

Gel Bed Permeability (GBP)

The gel bed permeability (GBP) of a swollen gel layer under a pressure of 0.3 psi (2070 Pa) is, as described in US 2005/0256757 (paragraphs [0061] and [0075]), determined as the gel bed permeability of a swollen gel layer of superabsorbent polymer particles.

EXAMPLES

Example 1

A 2 L stainless steel vessel was initially charged with 284.46 g of 50% by weight aqueous sodium hydroxide and 558.44 g of deionized water. The mixture was cooled down to 15° C. using a cooling bath. Then 251.21 g of first part of acrylic acid was added while stirring. The rate of addition was adjusted in such way that the temperature did not exceed 30° C. After addition, the mixture was kept at approximately 30° C. for 2 minutes.

Thereafter, additional 90.43 g of second part of acrylic acid was added under stirring while the temperature of the mixture was kept below 30° C. The degree of neutralization was 75 mol-%. After addition of the second portion of acrylic acid, the mixture was cooled down to 20° C. and 0.55 g of 17.5-tuply ethoxylated trimethylolpropane triacrylate was added under stirring. Then 0.036 g of 2-hydroxy-2-methylpropiophenone and 0.012 g of 2,2-dimethoxy-1,2-diphenylethan-1-one were added under stirring and the mixture was cooled down to 18° C. The oxygen was removed from the mixture by passing nitrogen through via a glass frit while the mixture was cooling down to 5° C.

Then 5.12 g of aqueous 2-hydroxy-2-sulfonato acetic acid disodium salt (as 5% by weight aqueous solution), 0.68 g of aqueous aluminum lactate (as 22% by weight aqueous solution), 3.42 g of aqueous methylglycinediacetic acid trisodium salt (as 40% by weight aqueous solution, available as Triton® M Liquid from BASF SE, Ludwigshafen, Germany) and 5.64 g of aqueous sodium persulfate (as 10% by weight aqueous solution) were added subsequently to the monomer solution. The monomer solution was transferred to a glass dish. The dimensions of the glass dish were such that a layer thickness of the monomer solution of 5 cm was established.

The mixture polymerized by placing the glass dish with the monomer solution under a UV lamp (UV intensity=25 mW/cm$^2$) for 11.5 minutes and turning off the UV lamp for another 4.5 minutes (total reaction time was 16 minutes).

The resulting polymer gel was ground with the aid of a commercial meat grinder with a 6 mm perforated disk. 3.42 g of aqueous sodium metabisulfite (as 5% by weight aqueous solution) was sprayed onto the ground gel and the gel was passed through the meat grinder two more times. The resulting polymer gel was dried in a laboratory drying cabinet at 180° C. for 60 minutes. The product was then ground by means of an ultra-centrifugal mill (Retsch model ZM100 with 12-tooth rotor and 1.5 mm ring sieve; speed at 14000 rpm, manufactured by Retsch GmbH, Haan, Germany) and the sieve fraction of 150 to 710 μm was obtained by sieving of the milled product.

1200 g of the polymer particles were mixed with 3.6 of aluminum hydroxide (as powder) for 2 minutes in a laboratory ploughshare mixer (model MR5, manufactured by Gebrüder Lödige Maschinenbau GmbH, Paderborn, Germany).

Next, a Solution A containing 0.36 g of ethylene glycol diglycidyl ether, 24 g of 1,2-propane diol, and 36 g of deionized water and a Solution B containing 24 g of aqueous aluminum lactate (as 22% by weight aqueous solution) were prepared. At a mixer speed of 200 rpm, the aqueous solutions (Solution A and B) were sprayed onto the polymer particles within one minute using a spray nozzle. The coated polymer particles were heated to 163° C. for 120 minutes. Then, the polymer particles were cooled down to 70° C. 32.5 g of deionized water was added to polymer particles. The polymer particles were mixed for 5 minutes. Then, the polymer particles were removed from the mixer and finally sieved (fraction of 150 to 710 μm).

Example 2

Example 1 was repeated without adding aluminum trihydroxide to the polymer particles.

Example 3 (Comparative)

Example 2 was repeated without adding aluminum lactate to the monomer solution.

Example 4 (Comparative)

Example 2 was repeated without adding methylglycinediacetic acid trisodium salt to the monomer solution.

Example 5 (Comparative)

Example 2 was repeated without adding aluminum lactate to the monomer solution and without adding methylglycinediacetic acid trisodium salt to the monomer solution.

TABLE 1

| | Experimental results | | |
|---|---|---|---|
| Example | CRC [g/g] | Vortex [s] | GBP [darcies] |
| 1 | 31.9 | 45 | 26.7 |
| 2 | 36.2 | 38 | 1.3 |
| 3*) | 33.1 | 54 | 4.1 |

TABLE 1-continued

| | Experimental results | | |
|---|---|---|---|
| Example | CRC [g/g] | Vortex [s] | GBP [darcies] |
| 4*) | 30.7 | 63 | 4.7 |
| 5*) | 30.4 | 55 | 4.8 |

*)comparative

The invention claimed is:

1. A process for producing superabsorbent polymer particles, comprising polymerization of a monomer solution comprising
   a) at least one ethylenically unsaturated monomer which bears acid groups and optionally at least partly neutralized,
   b) at least one crosslinker, and
   c) at least one initiator,
      drying a formed polymer gel, grinding the dried polymer gel, classifying and thermally surface postcrosslinking the resulting polymer particles, wherein the monomer solution further comprises from 0.001 to 1.00 mol-% of a chelating agent and from 0.0001 to 0.100 mol-% of an aluminum cation, each based on monomer a).

2. The process according to claim 1, wherein the monomer solution comprises from 0.050 to 0.25 mol-% of a chelating agent, based on monomer a).

3. The process according to claim 1, wherein the monomer solution comprises from 0.005 to 0.025 mol-% of an aluminum cation, based on monomer a).

4. The process according to claim 1, wherein the chelating agent in the monomer solution is an amino carboxylic acid or salt thereof.

5. The process according to claim 1, wherein the chelating agent in the monomer solution is methylglycinediacetic acid trisodium salt.

6. The process according to claim 1, wherein a source for the aluminum cation in the monomer solution is aluminum trilactate.

7. The process according to claim 1, wherein from 0.01 to 2.0% by weight of aluminum hydroxide, based on the polymer particles, is added to the polymer particles prior, during, or after thermal surface post-crosslinking.

8. The process according to claim 1, wherein from 0.15 to 0.6% by weight of aluminum hydroxide, based on the polymer particles, is added to the polymer particles prior, during, or after thermal surface post-crosslinking.

9. The process according to claim 1, wherein from 0.001 to 0.15 mol/kg of an aluminum cation, based on the polymer particles, is added as an aqueous solution to the polymer particles prior, during, or after thermal surface post-crosslinking.

10. The process according to claim 1, wherein from 0.005 to 0.05 mol/kg of an aluminum cation, based on the polymer particles, is added as an aqueous solution to the polymer particles prior, during, or after thermal surface post-crosslinking.

11. The process according to claim 9, wherein a source of the aluminum cation added to the polymer particles prior, during, or after thermal surface post-crosslinking is aluminum trilactate.

12. Superabsorbent polymer particles, comprising a chelating agent and an aluminum salt, obtained according to the process of claim 1.

* * * * *